(12) United States Patent
Ahn et al.

(10) Patent No.: US 6,385,187 B1
(45) Date of Patent: *May 7, 2002

(54) DEVICE AND METHOD FOR GENERATING SPREAD SPECTRUM SIGNAL USING PSEUDO-ORTHOGONAL CODE IN CDMA MOBILE COMMUNICATIONS SYSTEM

(75) Inventors: Jae-Min Ahn; Soon-Young Yoon; Hee-Won Kang; Young-Ky Kim, all of Seoul; Jong-Seon No, Kyonggi-do; Hong-Yeop Song, Seoul; Ha-Bong Chung; Je-Woo Kim, both of Kyonggi-do, all of (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,854

(22) Filed: Aug. 18, 1998

(30) Foreign Application Priority Data

Aug. 18, 1997 (KR) ............................................. 97-39199

(51) Int. Cl.[7] .................................................. H04J 13/02
(52) U.S. Cl. ...................................... 370/342; 370/208
(58) Field of Search ................................. 370/203, 208, 370/209, 320, 335, 479, 342, 441

(56) References Cited

U.S. PATENT DOCUMENTS

| 4,568,915 A | | 2/1986 | Gutleber | |
|---|---|---|---|---|
| 5,515,396 A | * | 5/1996 | Kotzin | 375/206 |
| 5,555,268 A | * | 9/1996 | Fattouche et al. | 375/206 |
| 5,881,056 A | * | 3/1999 | Huang et al. | 370/335 |
| 5,963,548 A | * | 10/1999 | Virtanen | 370/335 |
| 5,987,014 A | * | 11/1999 | Magill et al. | 370/335 |
| 6,014,034 A | * | 3/2000 | Fukumasa et al. | 370/203 |
| 6,064,663 A | * | 5/2000 | Honkasalo et al. | 370/335 |
| 6,163,566 A | * | 12/2000 | Shiino | 375/143 |

FOREIGN PATENT DOCUMENTS

| EP | 0680158 | 11/1995 |
|---|---|---|
| WO | 9516310 | 6/1995 |

OTHER PUBLICATIONS

Chih–Lin I et al., "Multi–Code CDMA Wireless Personal Communications Networks", Communications—Gateway to Globalization, Proceedings of the Conference on Communications, Seattle, Jun. 18–22, 1995, vol. 2, Jun. 18, 1995, pp. 1060–1064, IEEE.

* cited by examiner

*Primary Examiner*—Douglas Olms
*Assistant Examiner*—Ken Vanderpuye
(74) *Attorney, Agent, or Firm*—Dilworth & Barrese, LLP

(57) ABSTRACT

A device and method for generating a pseudo-orthogonal code for use in orthogonally spreading channel data in a CDMA mobile communications system. M orthogonal codes are selected from N orthogonal codes, for forming a pseudo-orthogonal codes, and the elements of the selected M orthogonal codes are sequentially interlaced to generate the pseudo-orthogonal code as a sequence of M×N elements.

33 Claims, 16 Drawing Sheets

DEVICE AND METHOD FOR GENERATING SPREAD SPECTRUM SIGNAL USING PSEUDO-ORTHOGONAL CODE IN CDMA MOBILE COMMUNICATIONS SYSTEM

BACKGROUND

1. Technical Field

The present application relates generally to a spread spectrum coding in a CDMA (Code Division Multiple Access) mobile communications system and, in particular, to a device and method for generating a spread spectrum signal using a pseudo-orthogonal code.

2. Description of the Related Art

In a CDMA mobile communications system, communication is conducted within a given frequency bandwidth that is shared by multiple users who are assigned differential codes. A data transmission rate for a user is generally very low relative to the frequency bandwidth. Spread spectrum coding is used to transmit a low-rate data with the high-rate frequency bandwidth, as well as for discriminating between users. Specifically, low-rate data bit sequences are spread with a high-rate spreading code so as to be transmitted/received in the given frequency bandwidth.

In a CDMA mobile communications system, an orthogonal code spreading scheme using Walsh codes is typically employed for user discrimination and spectrum spreading. Ideally, the orthogonality of the Walsh codes enables users or channels to be discriminated without interference.

Referring now to FIG. 1, a block diagram illustrates a conventional spread spectrum signal generating device using Walsh codes. A signal mapper 111 converts 0s and 1s of an input data bit sequence to +1s and −1s, respectively. An orthogonal code spreading and PN (Pseudo random Noise) masking unit 117 spreads the signal values +1s and −1s at a high rate. Specifically, the orthogonal code spreading and PN masking unit 117 orthogonally spreads the signal received from the signal mapper 111 with an assigned Walsh code Wi and then performs a PN masking on the spread signal using PN codes, PNi and PNq, to discriminate base stations or users. The PN-masked signals, Xi and Xq, are baseband-pass-filtered by baseband filter 119 and converted to a radio signal by frequency shifter 121.

Referring now to FIGS. 2A, 2B, and 2C, various embodiments are illustrated of the orthogonal code spreading and PN masking unit 117 of FIG. 1. FIG. 2A illustrates one embodiment of the orthogonal code spreading and PN masking unit 117 for a conventional IS-95 CDMA mobile communications system. In order to perform orthogonal spreading, a multiplier 211 multiplies an input signal of +1 or −1 by an assigned Walsh code Wi. The spread signal is a complex signal which is separated into a real and an imaginary component. The real and imaginary components are applied to multipliers 212 and 213, respectively. The multipliers 212 and 213 multiply the respective spread signals by a pair of PN codes, PNi and PNq, to perform PN masking.

FIG. 2B illustrates another embodiment of the orthogonal code spreading and PN masking unit 117 which doubles the number of available Walsh codes. In FIG. 2B, a serial-to-parallel converter 231 separately outputs odd-numbered and even-numbered signals of +1 or −1. Then, multipliers 222 and 223 multiply the odd-numbered signal and the even-numbered signal by the Walsh code Wi, respectively. For PN masking, a multiplier 224 multiplies the output of the multiplier 222 by a PN code, PNi, and a multiplier 225 multiplies the output of the multiplier 223 by a PN code, PNq. Since the transmission rate of a +1 or −1 signal in the directions of real and imaginary parts is half of the input transmission rate utilizing this method, the Walsh code length should be doubled. Thus, the number of available Walsh codes is virtually increased by factor of two.

FIG. 2C is another embodiment of the orthogonal code spreading and PN masking unit 117 of FIG. 1, which, as in FIG. 2, utilizes double the number of available Walsh codes (as compared to the embodiment of FIG. 1). In addition, PN masking is performed through complex spreading to thereby make the signal strengths of the real and imaginary component equal. In FIG. 2C, the serial-to-parallel converter 231 separately outputs odd-numbered and even-numbered signals of +1s or −1s. Then multipliers 232 and 233 multiply the odd-numbered signal and the even-numbered signal by the Walsh code Wi, respectively, and output signals di and dq. A complex multiplier 234 multiplies di and dq by PNi and PNq, respectively, and outputs PN-masked signals, Xi and Xq. The complex multiplier 234 operates in accordance with the following formula:

$$(Xi+jXq)=(di+jdq)*(Pni+jPNq) \tag{1}$$

The embodiment of FIG. 2C enables a signal to be recovered without interference because the Walsh code used for generating the spread spectrum signal exhibits a correlation value of 0 with respect to another Walsh code under an ideal condition (i.e., single path propagation).

Referring now to the graphs of FIGS. 3A and 3B, correlation characteristics of Walsh codes are illustrated. FIG. 3A illustrates the relationship between signal delay and auto-correlation, and FIG. 3B illustrates the relationship between signal delay and cross-correlation. In the case of auto-correlation as shown in FIG. 3A, a spread spectrum signal generated in the orthogonal code spreading and PN masking unit 117 of FIGS. 2A, 2B, and 2C is recovered with a strength equal to the length N of a Walsh code in code synchronization. A spread spectrum signal generated in the orthogonal code spreading and PN masking unit 117 of FIGS. 2A, 2B, and 2C will have a correlation value 1 (but not 0) when code misalignment occurs by a time delay of one or more chips. In the case of cross-correlation as shown in FIG. 3B, there is no interference when two Walsh codes are synchronized. But when code misalignment occurs by one or more chips, a 1-interference signal appears (i.e., an interference signal having a strength of 1/N relative to that of the original signal). Consequently, the influence of the interference signal is inversely proportional to the length N of the Walsh code. If a signal is received from at least two paths, and a delay of one or more chips exists between the paths, the orthogonality of the Walsh code is lost and an interference is generated due to the delayed signal.

The issue is how to define a delay time of one or more chips in the above situation. To provide a high rate data service, the frequency bandwidth should be increased, which implies that the time duration of one chip becomes shorter. The duration of one chip Tc is equal to the inverse of the available frequency bandwidth:

$$Tc=1/BW$$

Therefore, as BW doubles, $T_c$ decreases by half. Hence, a signal which is transmitted from a single path in a voice only service may exhibit a multipath propagation characteristic (i.e., a time elapse for at least one chip duration when an available frequency bandwidth is widened for a high-speed data service) which can I(Lz result in the loss of orthogonality of the Walsh code.

SUMMARY OF THE INVENTION

Therefore, it is an object of the present invention to provide a pseudo-orthogonal code generating device and method for providing a high-quality, high-speed data service over a CDMA mobile communications network.

It is another object to provide an encoding device and method, which can maintain the orthogonality of a signal transmitted on a multipath propagation channel by compensating for the delay time of the signal.

It is still another object to provide an encoding device and method which can prevent loss of the orthogonality of a spreading code caused by a multipath signal component by spreading data with a multipath resistant pseudo orthogonal code (MRPOC).

In one aspect, a method for generating a pseudo-orthogonal code for orthogonally spreading channel data in a CDMA mobile communications system includes the steps of selecting M orthogonal codes from N orthogonal codes to form a pseudo orthogonal code, sequentially interlacing the elements of the selected M orthogonal codes to generate the pseudo-orthogonal code as a sequence of M×N elements.

In another aspect, a device for orthogonally spreading channel data in a CDMA mobile communications system comprises a pseudo-orthogonal code generator having a table for storing M orthogonal codes which are selected from N orthogonal codes to form pseudo-orthogonal codes, in the form of index pairs, and generating a pseudo-orthogonal code as a sequence of M×N elements by sequentially interlacing the elements of the M orthogonal codes in an index pair corresponding to an input code index, the device also including a multiplexer for multiplexing input channel data to M-branch parallel data, a plurality of spreaders connected to each of the plurality of M-branches for spreading the M-branch data with M corresponding orthogonal codes by multiplication, and a demultiplexer for demultiplexing the parallel spread data to serial data.

These and other objects, features and advantages of the present invention will become apparent from the following detailed description of illustrative embodiments, which is to be read in connection with the accompanying drawings.

BRIEF DESCRIPIION OF THE DRAWINGS

FIG. 1 is a block diagram of a conventional device for generating a spread spectrum signal using a Walsh code in a CDMA mobile communications system;

FIGS. 2A, 2B, and 2C are block diagrams of various embodiments of an orthogonal code spreading and PN masking unit shown in FIG. 1;

Figure 4:
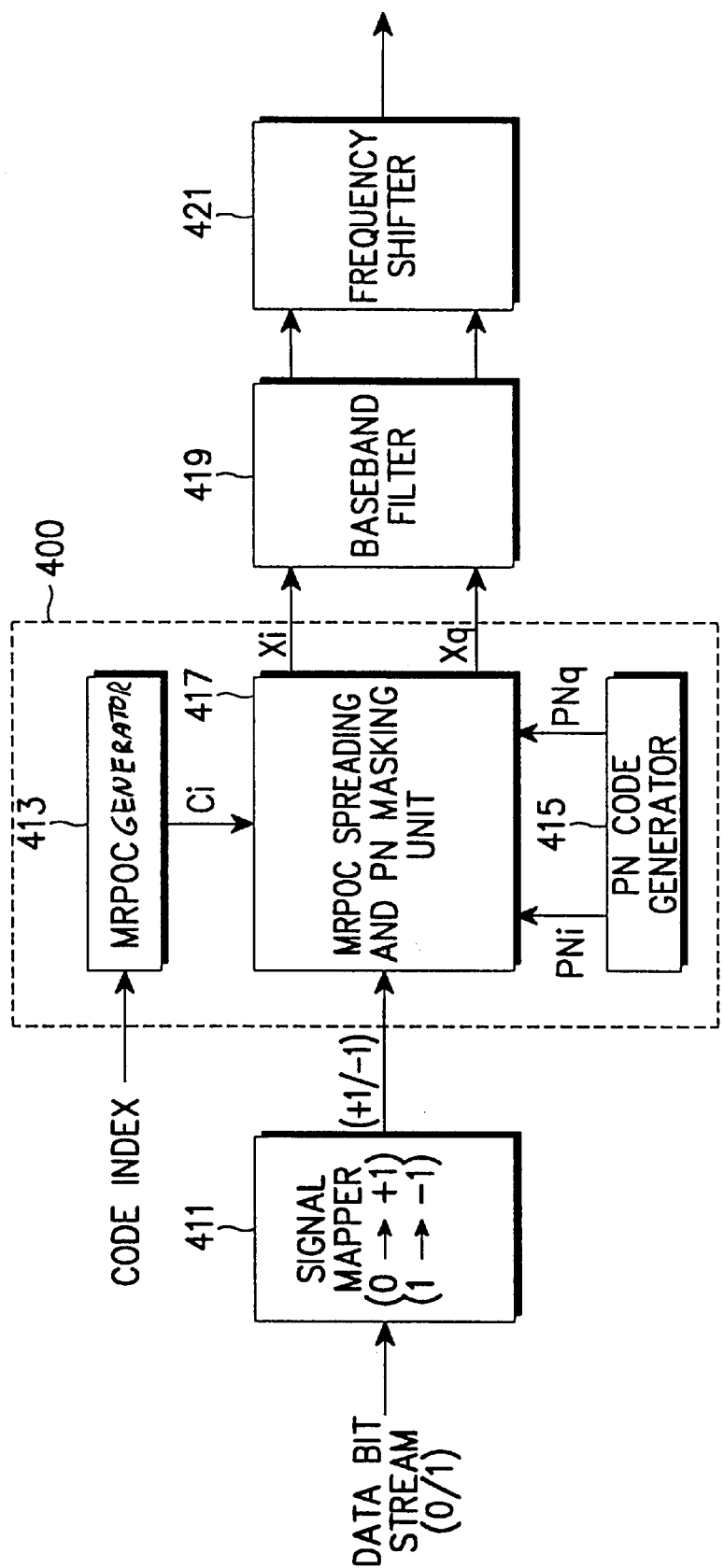
FIG. 4 is a block diagram of a spread spectrum signal generating device using an MRPOC in a CDMA mobile communications system according to an embodiment of the present invention.
Figure 5A:
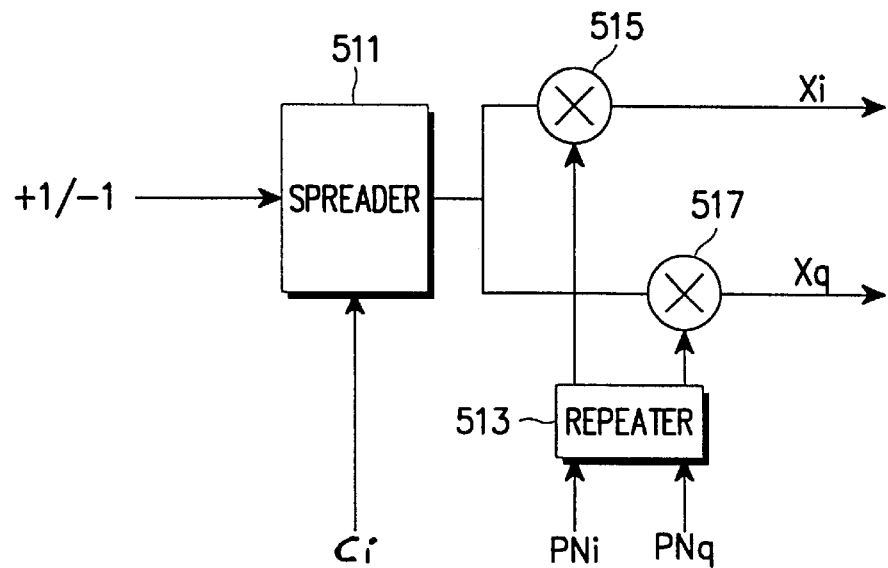
Figure 5B:
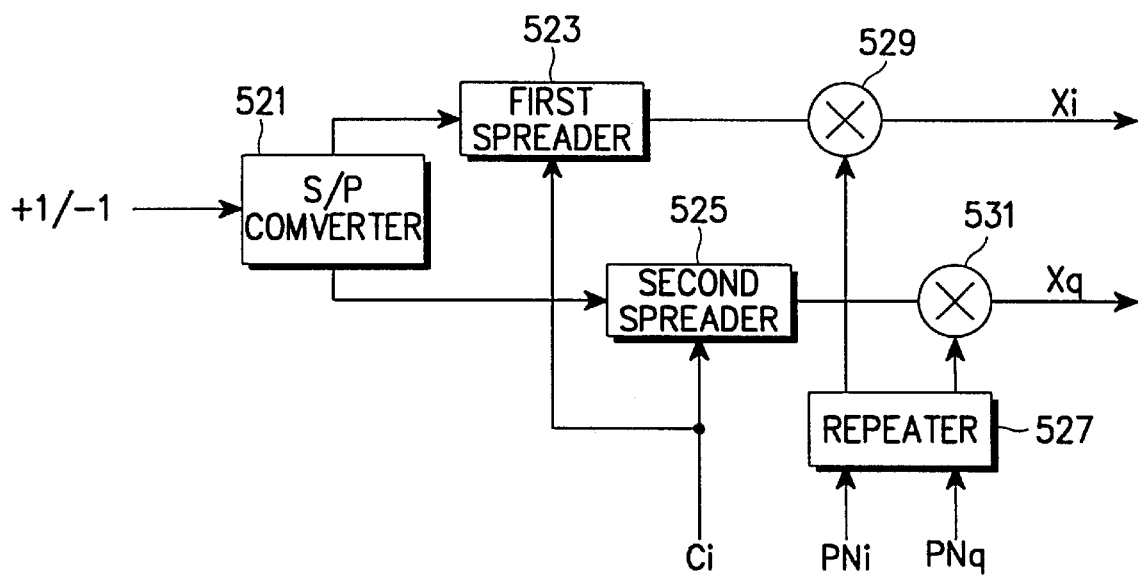
Figure 5C:
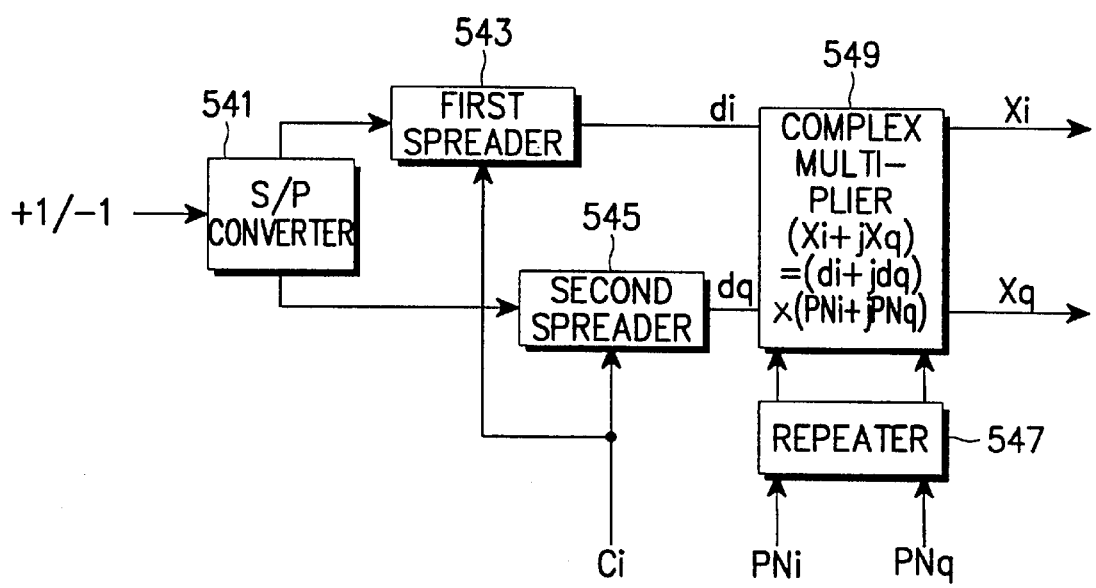
Figure 6:
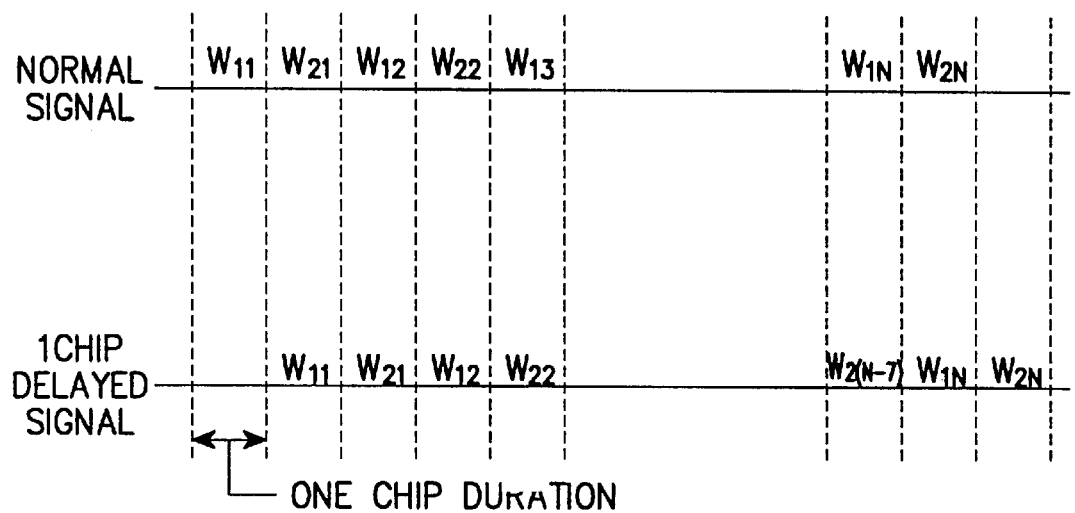
Figure 7A:
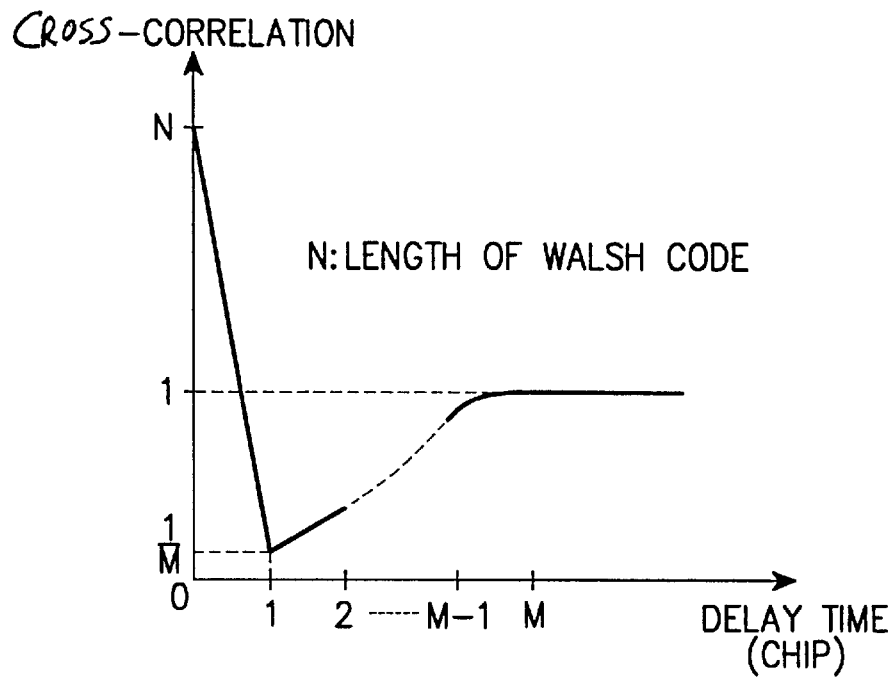
Figure 7B:
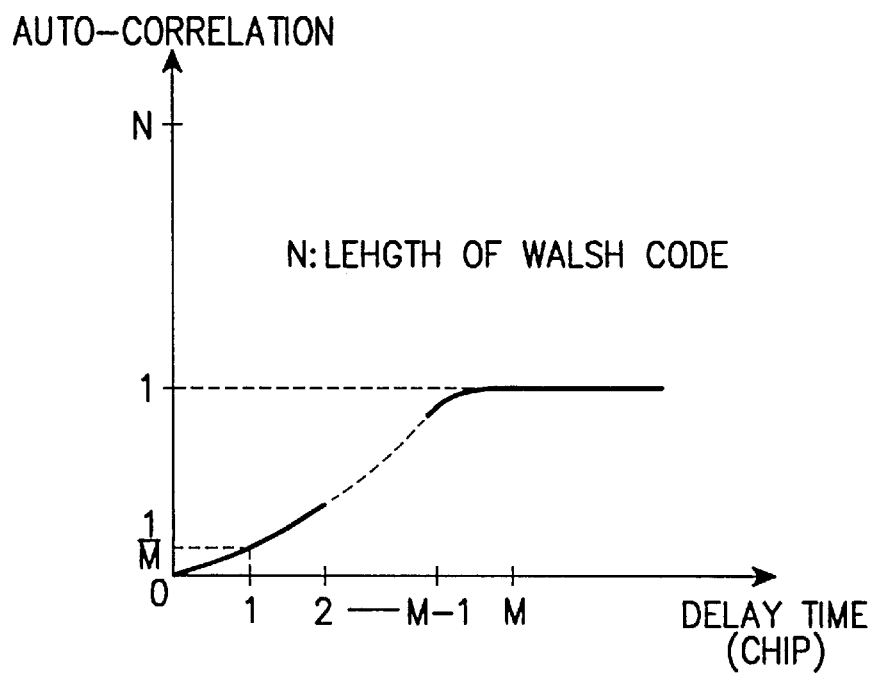
Figure 8:
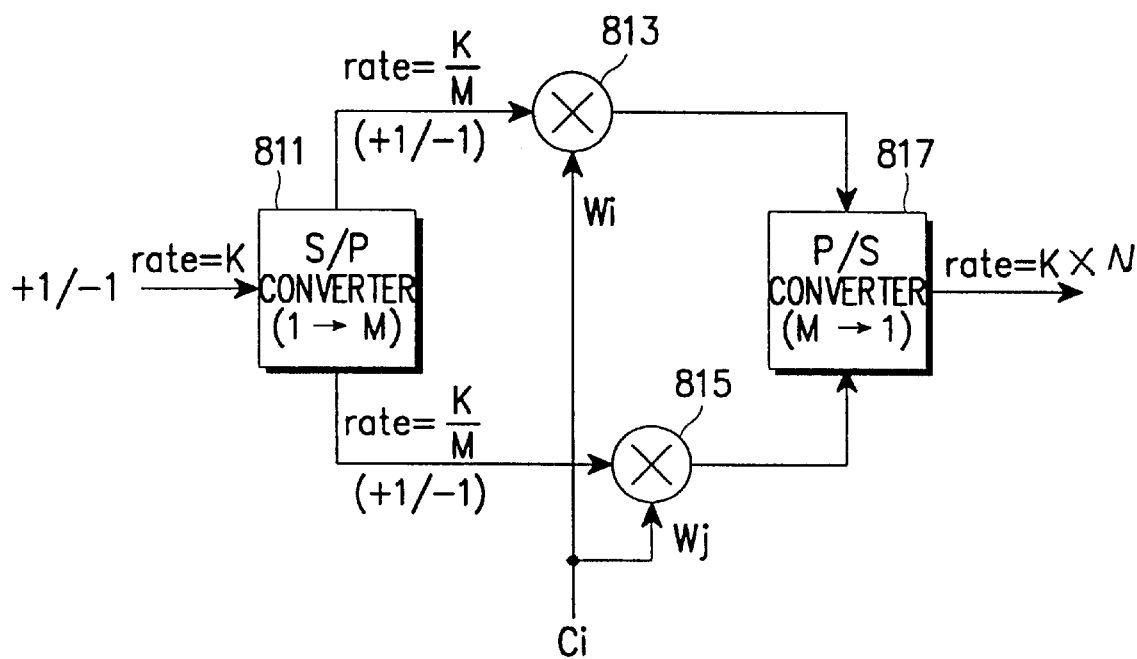
Figure 9:
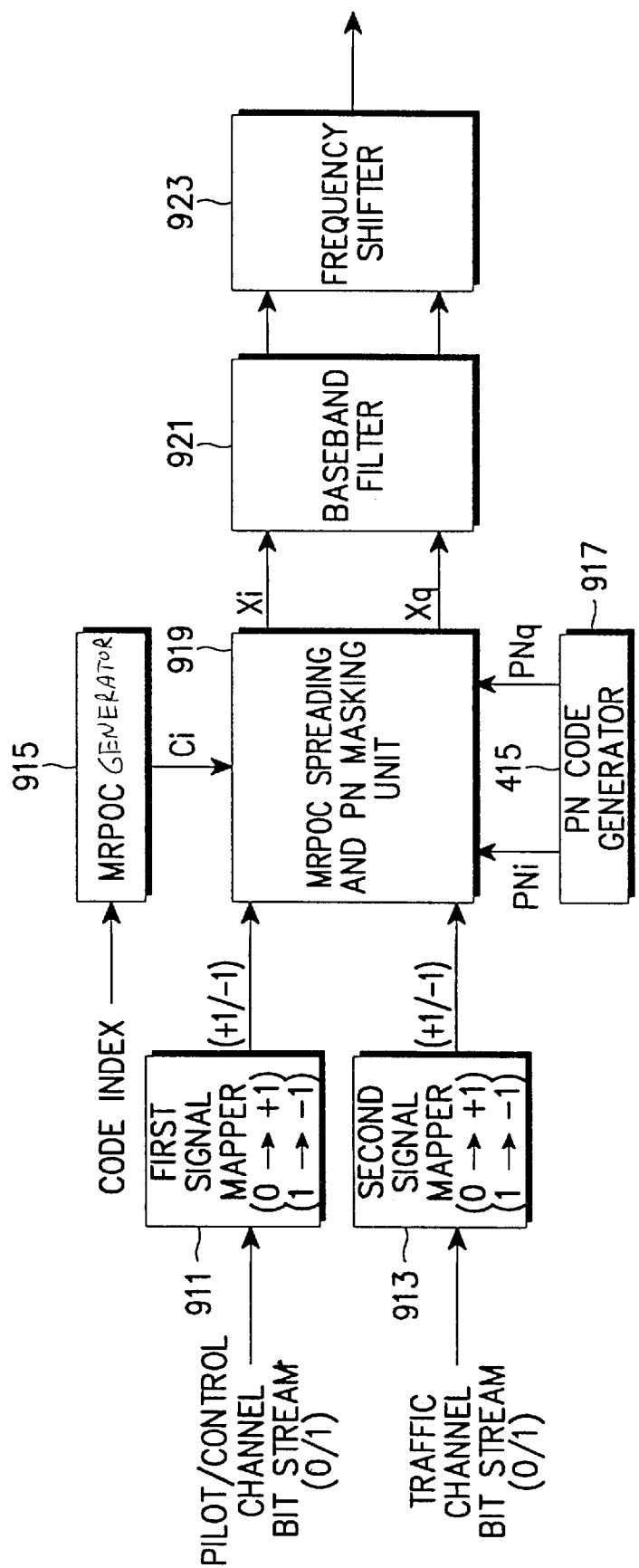
Figure 10:
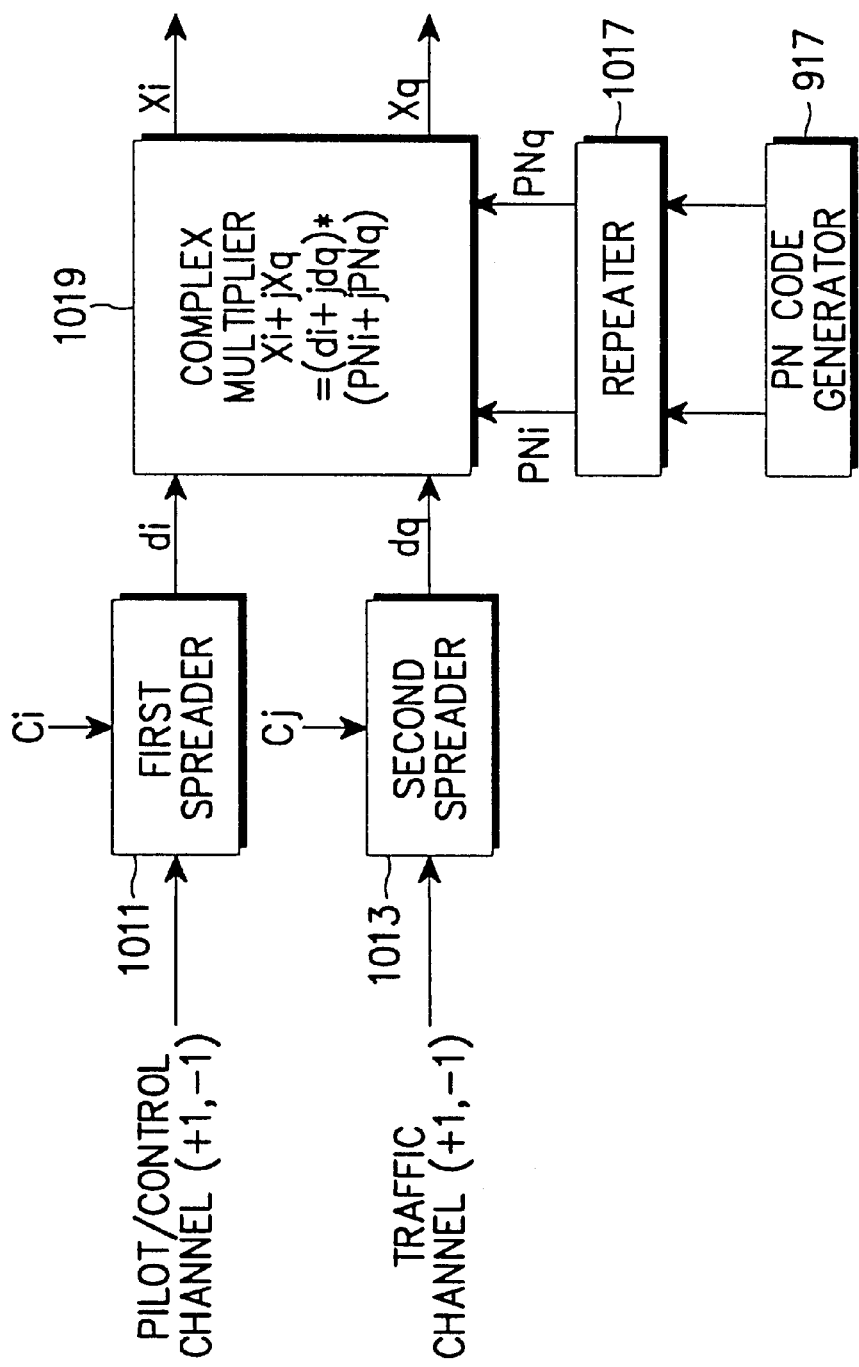
Figure 11:
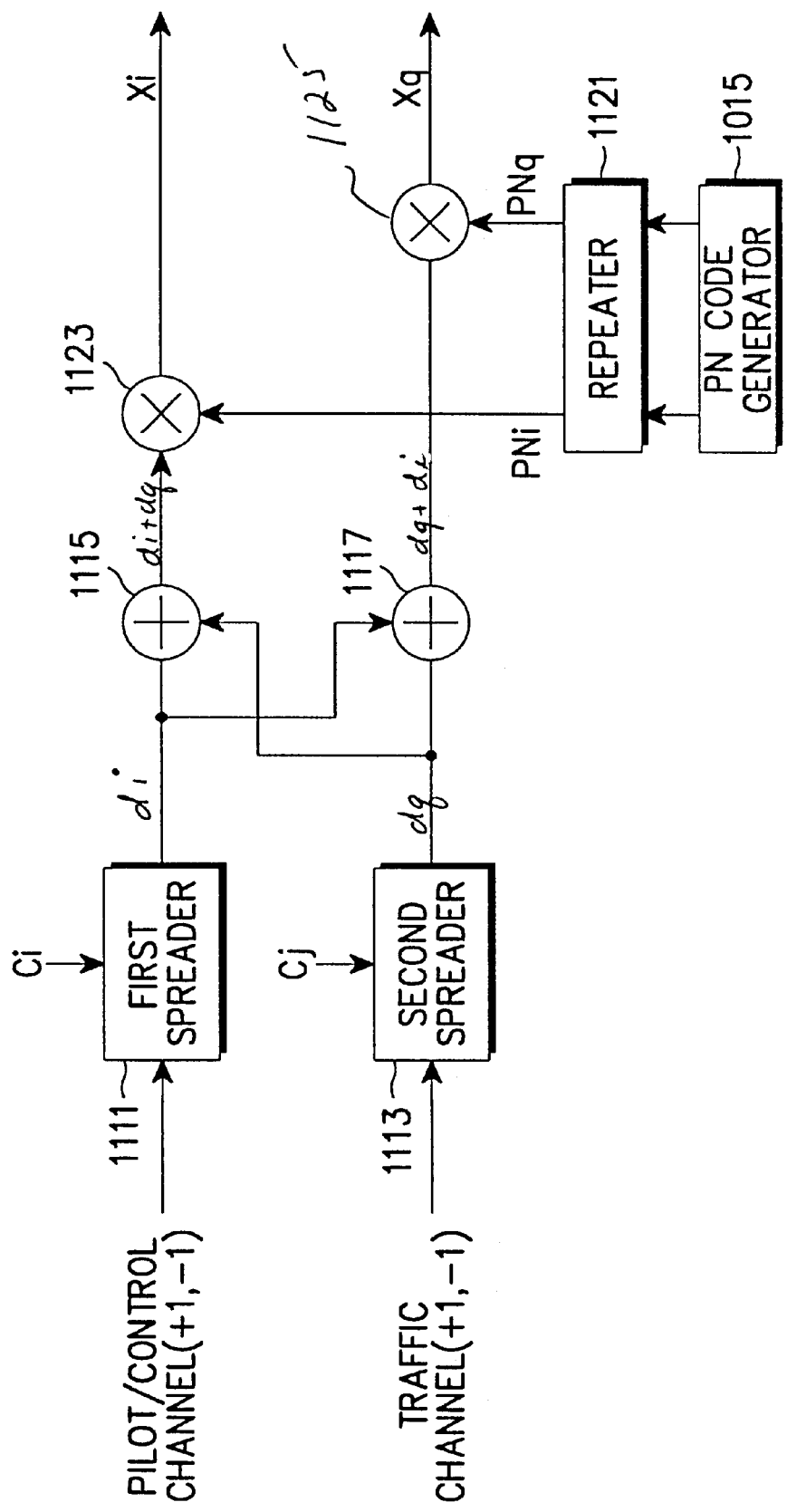
Figure 12:
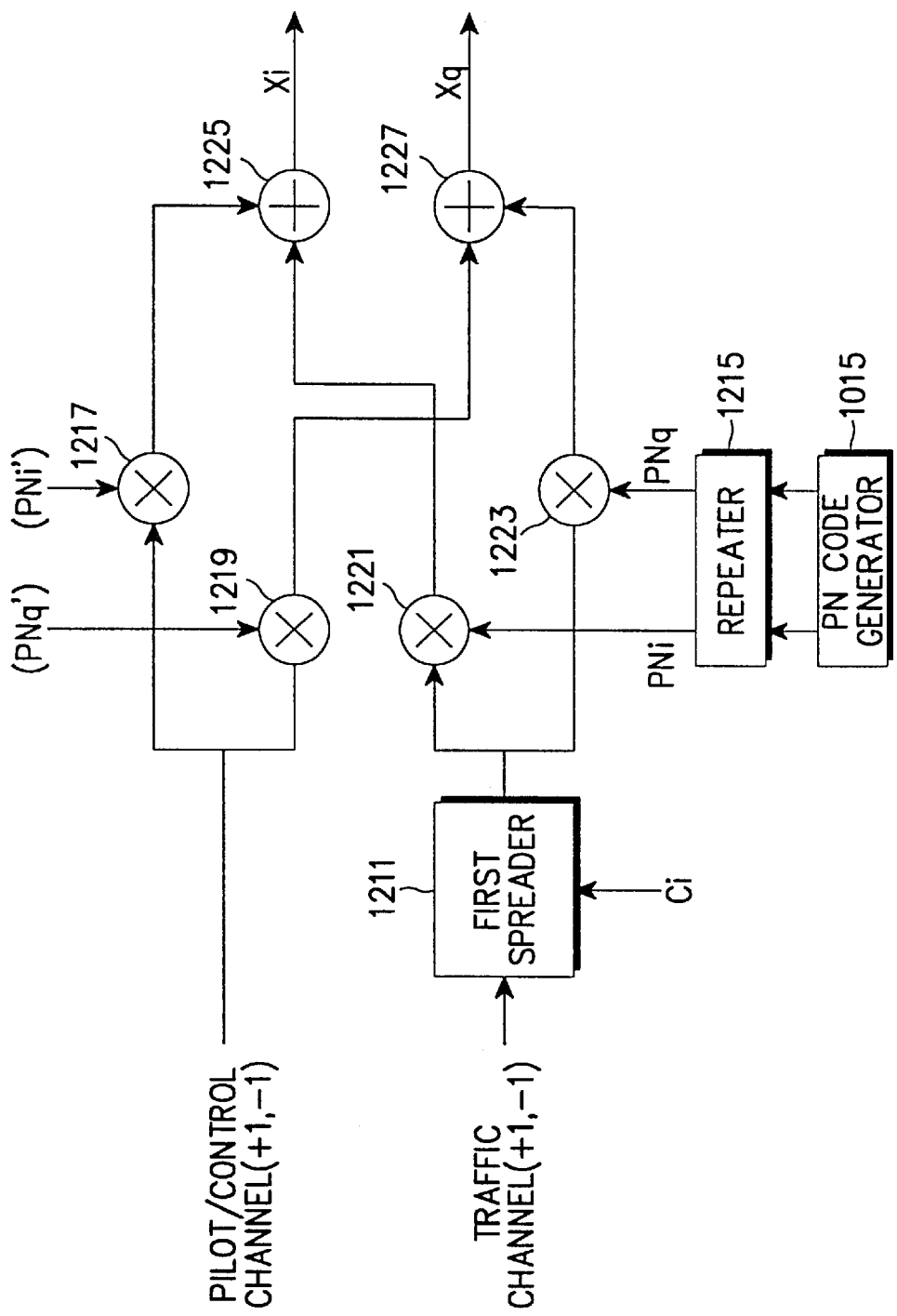
Figure 13:
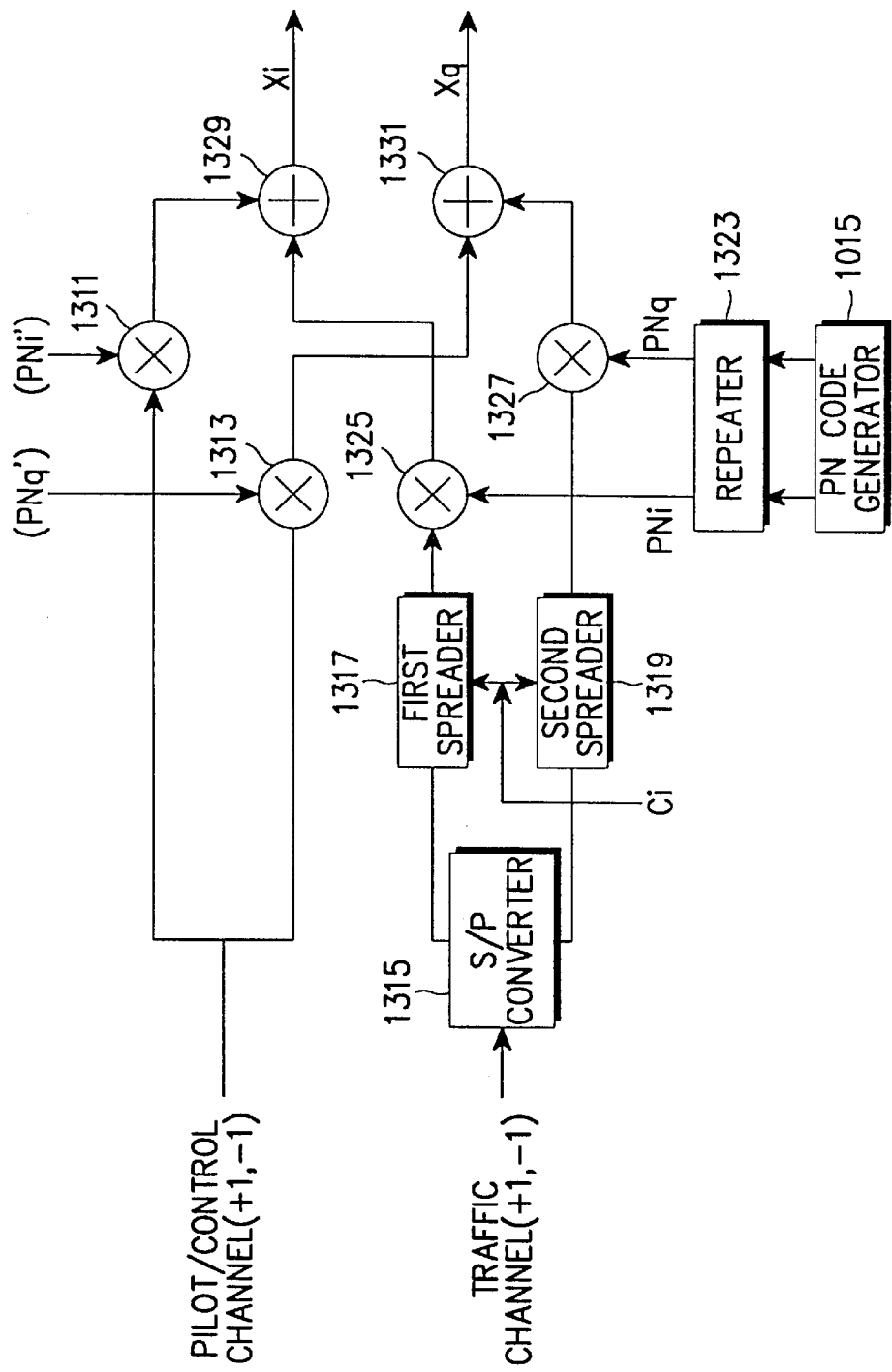
Figure 14:
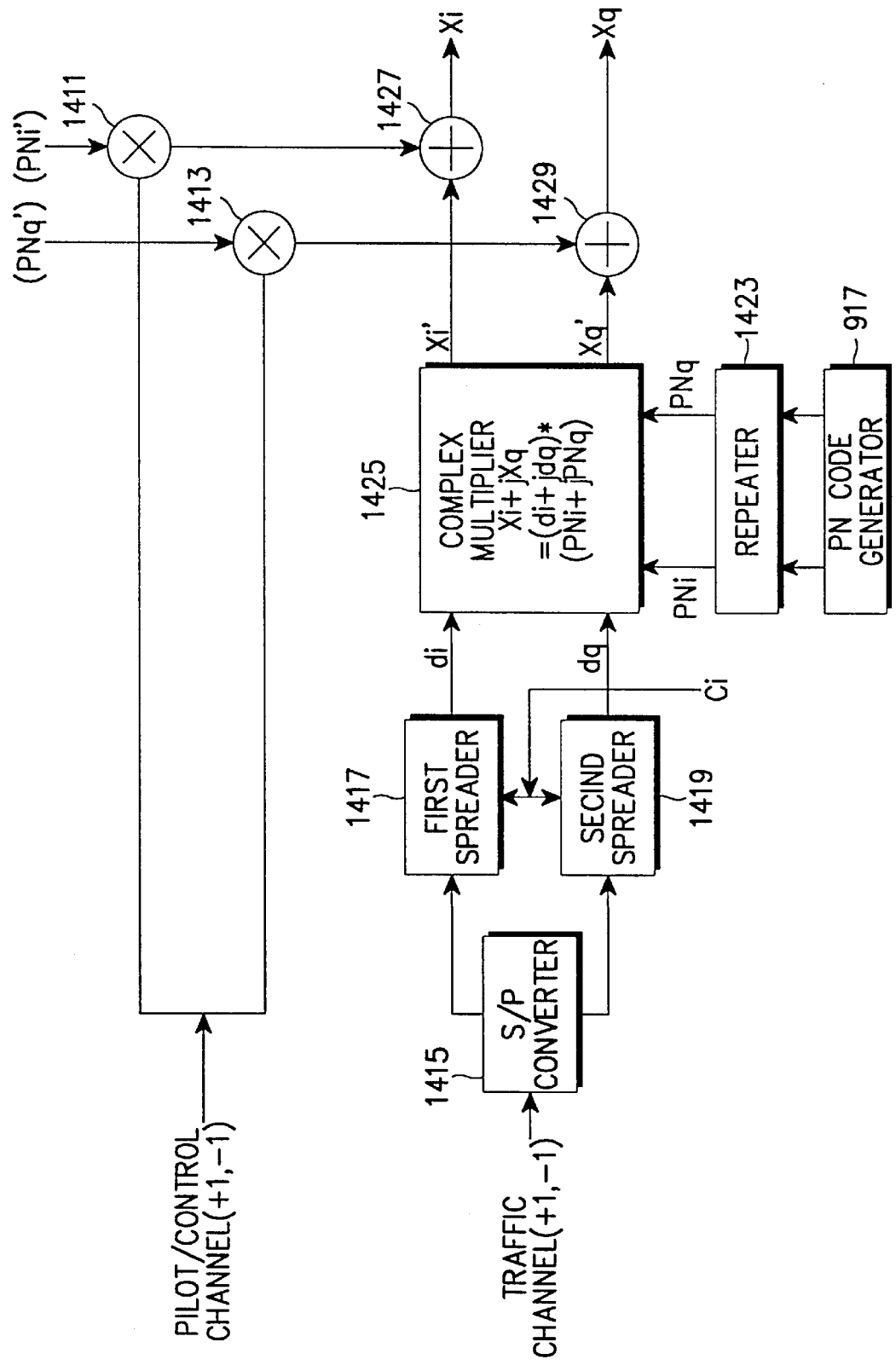

FIGS. 5A, 5B, and 5C are various embodiments of an MRPOC spreading and PN masking portion unit of FIG. 4 in accordance with the present invention;

FIG. 6 is a timing diagram of a combination of Walsh codes maintaining an orthogonality against one chip-delay and a one-chip delayed combination of Walsh codes;

FIGS. 7A and 7B are graphs showing correlation characteristics of a pseudo-orthogonal code derived from Walsh codes;

FIG. 8 is a block diagram of a spreader using a pseudo-orthogonal code in accordance with an embodiment of the present invention;

FIG. 9 is a block diagram of a transmitter using the pseudo-orthogonal code for a reverse link in accordance with one embodiment of the present invention;

FIG. 10 is a block diagram of a pseudo-orthogonal code spreading and PN masking unit for implementing a reverse link, in which pseudo-orthogonal codes are applied to a pilot/control channel and a traffic channel and PN masking is performed by complex spreading;

FIG. 11 is a block diagram of a pseudo-orthogonal code spreading and PN masking unit for a reverse link in accordance, with one embodiment of the present invention, in which pseudo-orthogonal codes are applied to both the pilot/control channel and traffic channel and PN masking is not performed by complex spreading in accordance with the present invention;

FIG. 12 is a block diagram of a pseudo-orthogonal code spreading and PN masking unit for a reverse link in accordance with another embodiment of the present invention, in which a pseudo-orthogonal code is applied to only the traffic channel and PN masking is not performed by complex spreading;

FIG. 13 is a block diagram of a pseudo-orthogonal code spreading and PN masking unit for a reverse link in accordance with a further embodiment of the present invention, in which the traffic channel is separated into odd-numbered bits and even-numbered bits, pseudo-orthogonal codes are applied to the odd-numbered and even-numbered bits, respectively, and PN masking is not performed by complex spreading; and FIG. 14 is a block diagram of a pseudo-orthogonal code spreading and PN masking unit for a reverse link in accordance with another embodiment of the present invention, in which the traffic channel is separated into odd-numbered bits and even-numbered bits, pseudo-orthogonal codes are applied to the odd-numbered and even-numbered bits, respectively, and PN masking is performed by complex spreading.

DETAILED DESCRIPTION OF PREFERRED EMBODIMENTS

When utilizing orthogonal spectrum spreading with Walsh codes, a signal transmitted on a single path propagation channel can have an improved signal-to-noise ratio since the single path propagation channel is free from an interference signal caused by another Walsh code. However, when two or more paths have a signal delay (i.e., difference in time of arrival) of one or more chips, a signal will suffer from interference from its own Walsh code and a different Walsh code assigned to another user, thereby losing the benefit of using the Walsh code. Therefore, if there is no interference signal despite a time delay of one or more chips, or if interferences involved in the existing Walsh codes can be significantly reduced, the signal-to-noise ratio of a signal transmitted on a multipath propagation channel may be improved. As discussed in further detail below, a multipath resistant pseudo-orthogonal code (MRPOC) may be utilized in accordance with the present invention to reduce the interference caused by a delay of one or more chips. In particular, an MRPOC for reducing interference caused by a delay time of one chip (i.e., a one chip resistant pseudo-orthogonal code), and a MRPOC for reducing interference caused by an M-chip delay time (i.e., an M-chip resistant pseudo-orthogonal code) are discussed in detail below.

Although Walsh codes are not used for a reverse link due to the difference in path delay time of signals from terminals to a base station in IS-95, advantageously, a pseudo orthogonal code which is capable of minimizing an interference signal despite a delay time of one or more chips can utilized on the reverse link with minimum time alignment. Accordingly, there is a need for utilizing such a pseudo orthogonal code and forming a reverse link using the same.

Referring now to FIG. 4, a block diagram illustrates a device for generating a spread spectrum signal using an MRPOC according to an embodiment of the present invention. A signal mapper 411 converts 0s and 1s of an input data bit stream to +1s and −1s, respectively. An MRPOC generator 413 generates an MRPOC Ci assigned by the code index of a corresponding channel. A PN code generator 415 generates a pair of PN codes, PNi and PNq, to be applied to the real and imaginary components, respectively. An MRPOC spreading and PN masking unit 417 multiplies the signal received from the signal mapper 411 by the MRPOC Ci and then by PNi and PNq for PN masking to generate signals Xi and Xq. A baseband filter 419 baseband-pass-filters the signals Xi and Xq, and a frequency shifter 421 shifts the signal received from the baseband filter 419 to an RF (Radio Frequency) signal. A spreading unit 400 comprises the MRPOC generator 413, the MRPOC spreading and PN masking unit 417, and the PN code generator 415.

The MRPOC generator 413 includes a table for storing MRPOCs and selectively outputs an MRPOC corresponding to a code index. The table stores index pairs of orthogonal codes. It is to be understood that the index pair refers to a pair of index codes for different orthogonal codes. Specifically, a one chip resistant pseudo-orthogonal code is a pair of two different orthogonal codes, a two chip resistant pseudo-orthogonal code is a combination of three different orthogonal codes, and an (M−1) chip resistant pseudo-orthogonal code is a combination of M different orthogonal codes. The code index indicates an address point value in the table.

For purposed of describing an MRPOC Ci generating procedure of the MRPOC generator 413, it is assumed that the number of orthogonal codes is N and the MRPOC Ci is generated using M orthogonal codes. Here, M is smaller that N and Ci={W1, . . . WM}. In particular, the MRPOC Ci is obtained by deriving a fractional set A with M elements (n(A)=M) from an orthogonal code set W={W1, . . . , WN}. The elements in set A are different codes. Index pairs in the MRPOC generator 413 can be listed from orthogonal codes as follow:

TABLE 1

| code index | index pair |
|---|---|
| 1 | W0, W20 |
| 2 | W2, W35 |
| 3 | W3, W63 |
| 4 | W4, W11 |
| 5 | W5, W47 |
| 6 | W6, W9 |
| = | = |
| = | = |
| = | = |

Orthogonal codes for MRPOC are used only once and the orthogonal code pairs can be approximated by tests. When a code index is generated, the orthogonal codes corresponding to the code index are selected. The elements of the selected orthogonal codes are interlaced. Accordingly, the MRPOC Ci is generated as a sequence of M×N elements.

A method of operation of the device of FIG. 4 will now be discussed. It is assumed that data is transmitted on an ith channel. A user is assigned an MRPOC Ci for use in spreading data. 0s and 1s of a data bit stream of the ith channel are converted to +1s and −1s, respectively, by the signal mapper 411. The signal spreading device 400 spreads the signal of +1 or 1 with the MRPOC Ci, performs a PN masking on the spread signal to discriminate users or base stations, and then outputs the PN-masked signal as a complex signal. The baseband filter 419 baseband-pass-filters the complex signal and the frequency shifter 421 shifts the signal received from the baseband filter 419 to an RF signal.

Figure 1:
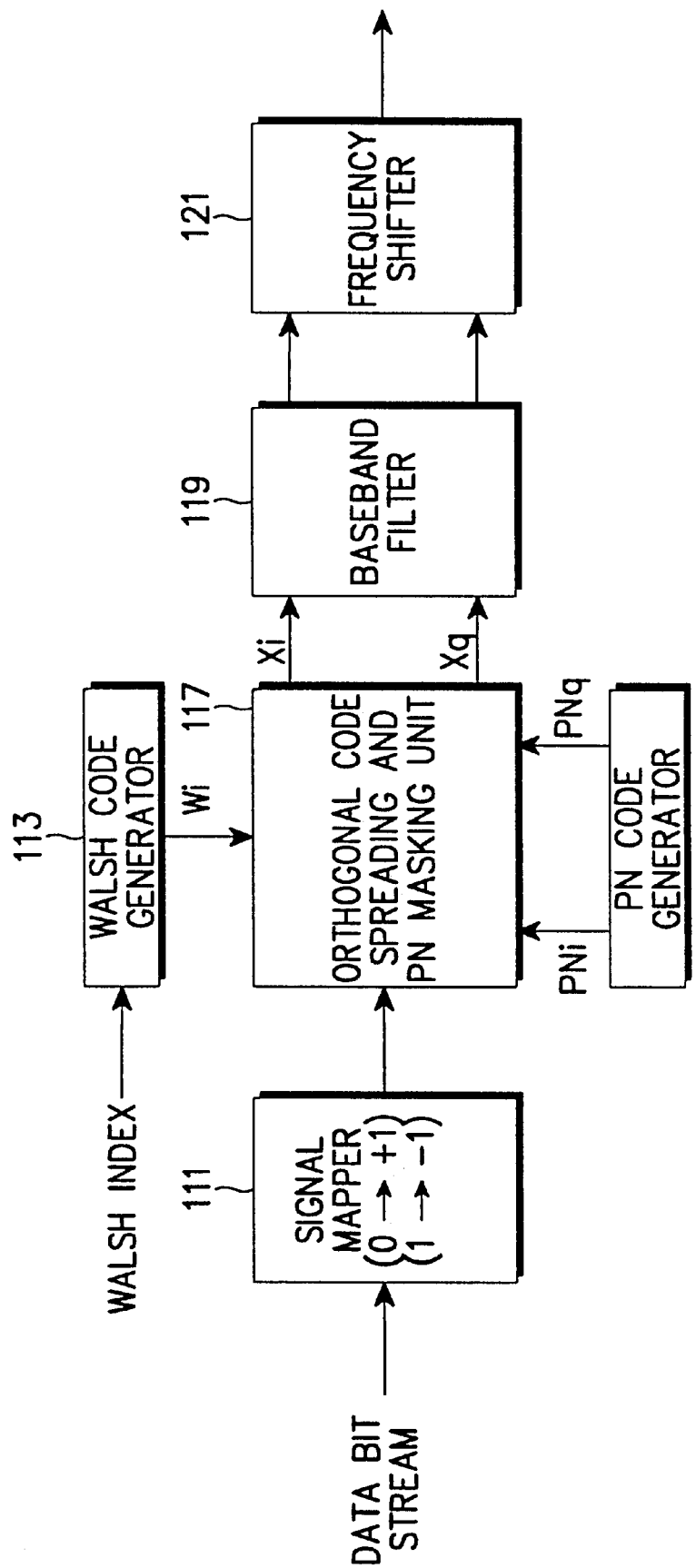
Figure 2A:
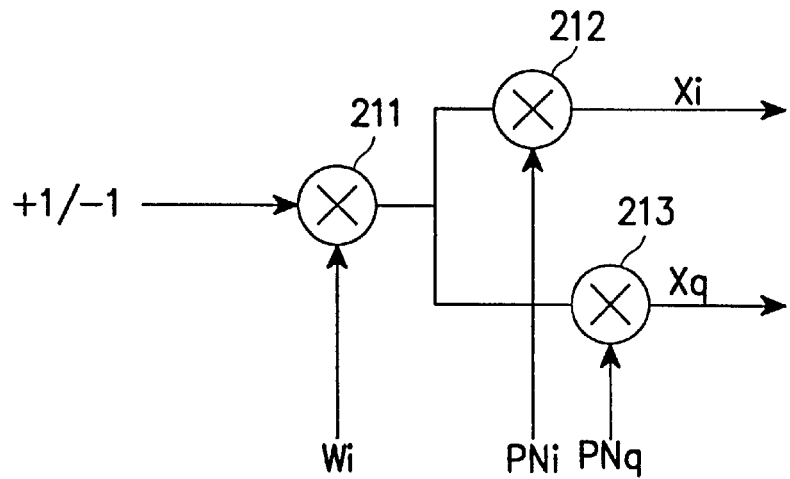
Figure 2B:
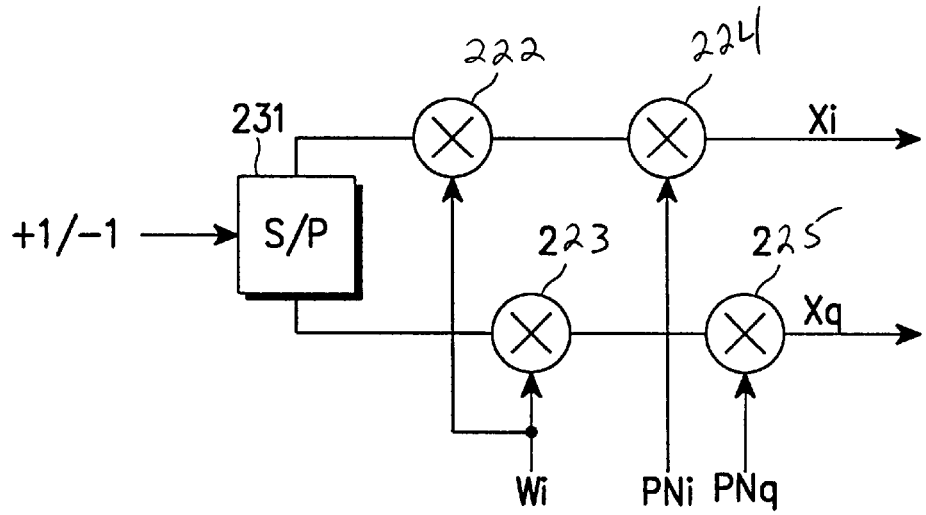
Figure 2C:
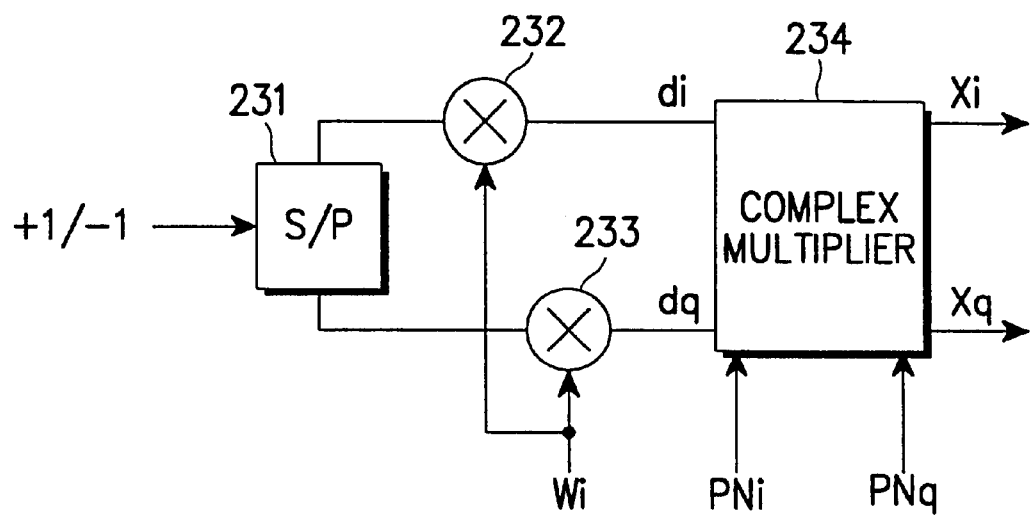
Figure 3A:
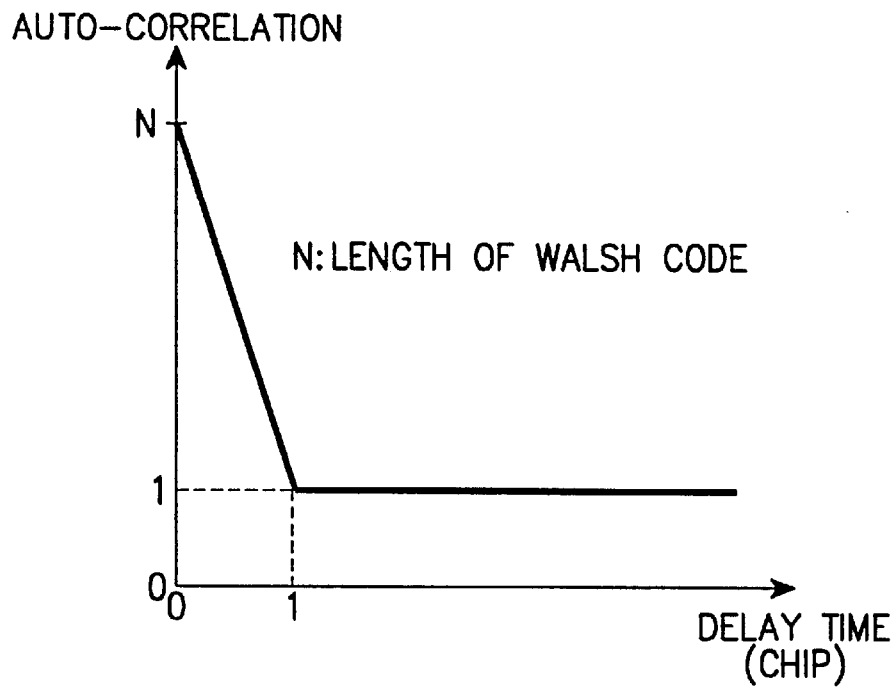
FIGS. 3A and 3B are graphs which illustrate correlation characteristics of a general Walsh code.
Figure 3B:
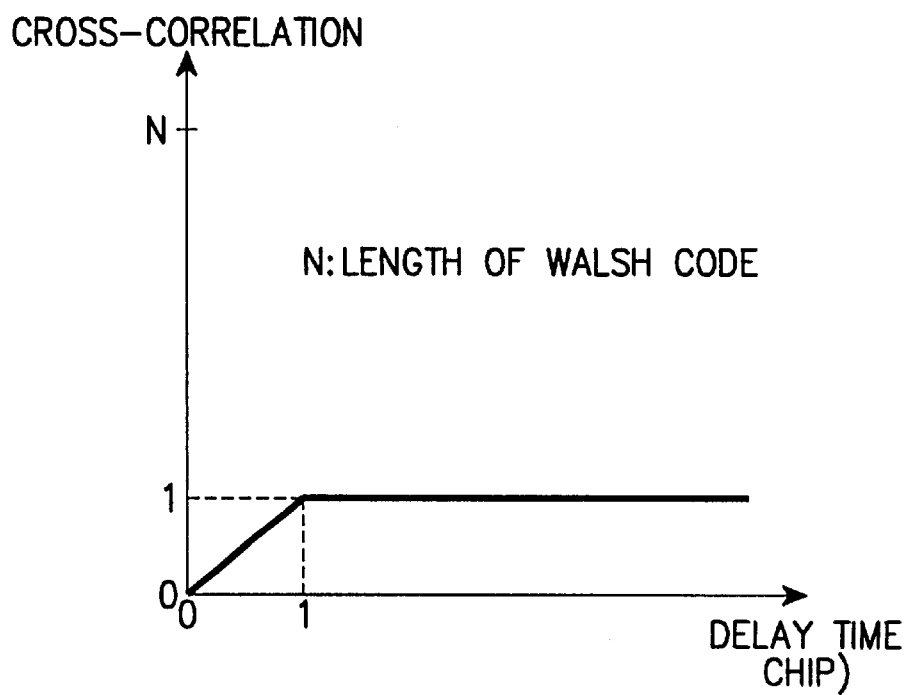

Referring now to FIGS. 5A, 5B, and 5C, various embodiments of the MRPOC spreading and PN masking unit 417 of FIG. 4 are illustrated. These embodiments are basically similar to the conventional devices shown in FIGS. 2A, 2B and 2C which use Walsh codes for orthogonal code spreading. However, the MRPOC spreading and PN masking unit 417 replaces the orthogonal code spreading and PN masking unit 117. In addition, a PN sequence for PN masking is repeated M times, i.e., the period of a PN code is M times longer in order to obtain the same spreading and masking effects. Here, M indicates that an interference signal can be reduced with respect to a path delay time as long as (M−1) chips, as compared to the orthogonal spreading using Walsh codes.

Referring to FIG. 5A, an MRPOC spreader 511 orthogonally spreads a signal of +1 or −1 received from the signal mapper 411 with the MRPOC Ci and separates the spread signal into a real and an imaginary component. A repeater 513 repeats the PN codes, PNi and PNq, received from the PN code generator 415 for M number of times. A multiplier 515 multiplies the real component received from the MRPOC spreader 511 with the M repeated PN code, PNi, and generates a spread signal Xi. A multiplier 517 multiplies the imaginary component received from the MRPOC spreader 511 with the M repeated PN code, PNq, and generates a spread signal Xq.

In FIG. 5B, the MRPOC spreading and PN masking unit 417 is structured to increase the number of the available MRPOCs. A serial-to-parallel converter 521 separately outputs odd-numbered and even-numbered signals of +1 or −1. Then, first and second spreaders 523 and 525 multiply the odd-numbered signal and the even-numbered signal by the MRPOC Ci, respectively. For PN masking, a multiplier 529 multiplies the output of the first spreader 523 by the M repeated PN code, PNi, and outputs the spread signal Xi. Likewise, a multiplier 531 multiplies the output of the second spreader 525 by the M repeated PN code, PNq, and generates the spread signal Xq.

Since the transmission rate of a +1 or −1 signal in the directions of real an imaginary parts with this method is half of the transmission rate for the input, the length of the MRPOC is doubled. Thus, the number of available MRPOCs is virtually increased by a factor of two.

In FIG. 5C, a block diagram illustrates another embodiment of the MRPOC spreading and PN masking unit 417, wherein the number of available MRPOCs is doubled and PN masking is performed through complex spreading to thereby make the signal strengths of a real and imaginary component equal. A serial-to-parallel converter 541 separately outputs real and imaginary parts of odd-numbered and even-numbered signals of +1s or −1s. Then, first and second spreaders 543 and 545 multiply the odd-numbered signal and the even-numbered signal by the MRPOC Ci, respectively, and output di and dq. A complex multiplier 549 multiplies di and dq by PNi and PNq, respectively and outputs PN-masked signals, Xi and Xq. Here, the complex multiplier 549 operates in accordance with the equation $(Xi+jXq)=(di+jdq)*(Pni+jPNq)$.

When, as illustrated in FIG. 5C, a spread spectrum signal is generated using the MRPOC Ci, a correlation value between the MRPOC Ci and another MRPOC is 0, thereby enabling signal recovery without any interference.

When designing a transmitter employing the above spread spectrum method, the orthogonality loss associated with using Walsh codes due to multipath propagation can be suppressed if a delay time falls within a predetermined range despite the existence of the multipath propagation characteristic. This is done by spreading a signal with a combination of alternately arranged Walsh codes so as to ensure orthogonality between a delayed signal component transmitted from multiple paths and a normal signal component.

This concept is illustrated in FIG. 6, which is a timing diagram of a combination of two alternate Walsh codes, one being mutually orthogonal to another having a time delay of one chip. In FIG. 6, a normal signal is obtained by combining two Walsh codes W1 and W2. Specifically, the Walsh codes W1 and W2 are arranged in the order of the first element of the Walsh code W1 (i.e., W11), the first element of the Walsh code W2 (i.e., W21), the second element of the Walsh code W1 (i.e., W12), the second element of the Walsh code W2 (i.e., W22) . . . , the Nth element of the Walsh code W1 (i.e., W1N), and the Nth element of the Walsh code W2 (i.e., W2N). The combined code can be expressed as follows:

$$W_{no\ delay} = \{W11, W21, W12, W22, W13, W23, \ldots, W1N, W2N\}$$

For Wxy, x and y denote an orthogonal code number and an element number of the orthogonal code, respectively. Accordingly, W11 is the first element of an orthogonal code W1, and W2N is an Nth element of an orthogonal code W2. Here, an element is a chip. For example, for the number of elements in an orthogonal code=8, pairs of orthogonal codes for forming an MRPOC in the table of the MRPOC generator 413 may be listed as shown in the following table 2.

TABLE 2

| code index | Wx | Wy<br>Wx1–Wx8 |
|---|---|---|
| 1 | W1 | ++++++++ |
|   | W20 | +–+–+–+– |
| 2 | W2 | ++– –++– – |
|   | W35 | +– –++– –+ |
| 3 | W3 | ++++– – – – |
|   | W63 | +–+–-+-+ |
| 4 | W4 | ++– – – –++ |
|   | W11 | +– –+-++– |

Therefore, with a code index of 1, an MRPOC is generated as "+++-+++-+++-+++-", and with a code index of 2, an MRPOC is generated as "+++----+++----+". In the method for generating MRPOC discussed above, M orthogonal codes are selected from N orthogonal codes, and their combinations are listed in the table. Then an orthogonal code combination is selected according to a code index and the elements of the orthogonal codes in the combinations are interlaced, thereby generating MRPOC Ci. For interlacing, the selected M orthogonal codes are read from a matrix by columns, thereby generating an MRPQC as a sequence of M×N elements.

Then, a receiver separates the elements of the Walsh codes W1 and W2 from the combined code and decodes them, independently. In this case, the normal signal maintains orthogonality since the correlation values between its Walsh code W1 and a reference Walsh code W1 and between its Walsh code W2 and a reference Walsh code W2 are equal to N. For the one-chip delayed signal, a correlation value is calculated between the reference code W1 and a W2 component of the input signal and between the reference code W2 component and a W1 component thereof. Since the codes W1 and W2 are different, the correlation value is 0. Therefore, by combining Walsh codes in this manner, a code may result which is orthogonal to a signal delayed by one chip. By sequentially combining M different Walsh codes in such a manner as in FIG. 6, a correlation value with respect to a signal having a delay no greater than (M−1) chips is always 0, and there exists a correlation value other than 0 with respect to a normal signal only. Thus, a code can be obtained, which is orthogonal to a signal delayed even by (M−1) chips.

However, a CDMA signal uses a PN code for discrimination among users and base stations, as well as spectrum-spreading. The PN code is multiplied by data to be spread. Hence, it is impossible to ensure full orthogonality for the CDMA signal because the orthogonality of a Walsh code which is viable with respect to a one chip-delayed signal is lost due to multiplication of the PN code by the Walsh code. To prevent this, a common PN code should be applied to a pair of values resulting from two Walsh codes. In this case, one of two correlation calculations with respect to the Walsh codes W1 and W2 shows orthogonality and the other results in a value other than 0 (the correlation value obtained from a general Walsh function) as in the example of FIG. 6. Therefore, a correlation value with respect to a one-chip delayed signal is not 0 but a half of the correlation value that would be derived from the general Walsh code.

In the case of (M−1) chip-delay, a correlation value of 1/M is calculated for one chip-delay and 2/M for two chip-delay. FIGS. 7A and 7B are graphs of correlation characteristics of a Walsh code combination, which are improved despite even (M−1) chip-multipath propagation delay. It is noted from the drawings that the interference involved in the combined Walsh code of the present invention is reduced from that caused by a one chip-delayed signal and resulting in loss of orthogonality by about $(10*\log_{10}M)$ dB. For example, with M=2, the interference reduces approximately 3 dB, and with M=4, approximately 6 dB.

Referring now to FIG. 8, a block diagram illustrates an MRPOC spreader using the above pseudo orthogonal code. The MRPOC spreader illustrated in FIG. 8 may be one of those spreaders shown in FIGS. 5A, 5B, and 5C. The input of the MRPOC spreader is a signal sequence of +1s or −1s with a transmission rate of K. The input signal sequence is divided into M branches by a serial-to-parallel converter 811, with each divided signal sequence of +1s and −1s having a transmission rate of K/M. That is, the serial-to-parallel converter 811 acts to sequentially assign signals of +1s or −1s to 1 through the Mth branch. Hence, each branch transmits a signal at a 1/M transmission rate.

Assume that an MRPOC is composed of M different Walsh codes and has a length of N. In this case, each signal value at a branch is spread with an N Walsh code sequence. If a signal at each branch is represented by $a_i$ (where i=1, 2, . . . , and M), a Walsh code for the branch is $W_i$ (where i=1, 2, . . . , and M), and an element of a Walsh code is $W_{ij}$ (where i=1, 2, . . . , and M, and j=1, 2, . . . , and N), a spread signal from each branch can be given in a matrix shown as follows:

$$a_iW_i=[a_iW_{i1}, a_iW_{i2}, a_iW_{i3}, \ldots, a_iW_{iN}]$$

$$\begin{pmatrix} a_1W_{11} & a_1W_{12} & a_1W_{13} & \ldots & a_1W_{1N} \\ a_2W_{21} & a_2W_{22} & a_2W_{23} & \ldots & a_2W_{2N} \\ \vdots & \vdots & \vdots & \vdots & \vdots \\ a_MW_{M1} & a_MW_{M2} & a_MW_{M3} & \ldots & a_MW_{MN} \end{pmatrix}$$

The parallel-to-serial converter 817 reads the above matrix by columns and outputs the read sequence at a data rate of K×N, given as $$a_1W_{11}, a_2W_{21}, \ldots, a_MW_{M1}, a_1W_{12}, a_2W_{22}, \ldots, a_mW_{MN}$$

That is, the MRPOC spreader changes M data signals of +1s or −1s to M×N signal sequences which exhibit sufficient resistant against a multipath propagation signal component delayed by no more than (M−1) chips.

It is to be appreciated that the above MRPOCs can be generated by use of a general orthogonal code such as Walsh codes. Other orthogonal codes may substitute for the Walsh codes in order to obtain the same effects.

A method for generating a spread spectrum signal using MRPOCs, as well as the method for generating an MRPOC, has been described in detail. A transmitter using an MRPOC in accordance with the present invention can transmit a signal without. interference on a single path propagation channel (as with an orthogonal code), and achieve significant reduction in interference in a multipath propagation channel as long as a delay time is below (M−1) chips relative to the orthogonal code.

Conventionally, for a reverse link in IS-95 CDMA system, only a PN code is applied to a reverse traffic channel to discriminate users due to the difficulty in enabling signals from terminals to arrive at a base station at the same time. Advantageously, the use of the MRPOCs can significantly increase reception performance relative to the PN code if transmission signals from the terminals can reach the base station within a delay time of (M−1) chips.

Notwithstanding that no efforts have been expended for providing concurrent arrival of signals from terminals to a base station, the MRPOCs of the present invention can be implemented to mitigate the effects from signal delay. In particular, if a signal is transmitted from a terminal to the base station on a multipath propagation channel, the base station can perform a despreading using the MRPOC of a corresponding terminal to receive the signal from the terminal. In this process, the base station obtains a signal having a signal component and an interference component. The signal component is derived from the signal of the corresponding terminal and the interference component is derived from a signal transmitted from another terminal and a delayed signal component from the corresponding terminal. Since there is no effort for concurrent arrival of transmission signals from terminals to a base station, the interference component originated from the terminals except for the corresponding terminal appears from the unsynchronized random PN codes. The interference component from the delay signal component of the corresponding terminal is smaller than that from the unsynchronized random PN code if the delay time is within (M−1) chips.

Accordingly, the application of an MRPOC to a reverse link can reduce an interference signal generated from either a different terminal or a delayed signal from a corresponding terminal, regardless of time alignment for terminals. Needless to say, time alignment provides a significant reduction of interference signals.

Referring now to FIG. 9, a block diagram illustrates a transmitter on a reverse link which utilizes an MRPOC spreader to increase performance. A first signal mapper 911 converts 0s and 1s of an input pilot/control channel data bit stream to +1s and −1s, respectively. A second signal mapper 913 converts 0s and 1s of an input traffic channel data bit stream to +1s and −1s, respectively. An MRPOC generator 915 generates a MRPOC Ci code which is assigned by the code index of a corresponding channel. A PN code generator 917 generates PN codes, PNi and PNq, for the real and imaginary components, respectively. A reverse MRPOC spreading and PN masking unit 919 spreads the signals received from the first and second signal mappers 911 and 913 with the MRPOC Ci, multiplies each of the spread signals by the PN codes PNi and PNq, respectively, so as to generate the PN-masked signals Xi and Xq. A baseband filter 921 baseband-pass-filters the signals Xi and Xq and a frequency shifter 923 shifts the frequency of the signal received from the baseband filter 921 to an RF frequency.

In FIG. 9, it is assumed that a pilot/control channel (which is a reference signal) and a traffic channel are occupied by a user terminal. The user terminal transmits a data bit of 1 or 0 on the traffic channel and a data bit of 1 or 0 as a reference signal on the pilot/control channel so as to provide synchronous demodulation of the traffic channel. The data 1s or 0s are converted to +1s and −1s by the first and second signal mappers 911 and 913. Then, the reverse MRPOC spreading and PN masking unit 919 generates a spread complex signal of a baseband with a real component of Xi and an imaginary component of Xq. The baseband filter 921 modulates the signal received from the MRPOC spreading and PN masking unit 919 using an OQPSK (Offset Quadrature Phase Shift Keying) technique and filters the modulated signal. The frequency shifter 923 converts the output of the baseband filter 921 to an RF spread signal.

The reverse MRPOC spreading and PN masking unit 919 can have various embodiments. FIG. 10 is one embodiment of the reverse MRPOC spreading and PN masking unit 919 in which MRPOCs Ci and Cj are applied to the pilot/control channel and the traffic channel, respectively, and PN masking is performed by complex spreading. FIG. 11 is another embodiment of the reverse MRPOC spreading and PN masking unit 919 in which MRPOCs are applied to the pilot/control channel and the traffic channel and no complex spreading is performed for PN masking. FIG. 12 is still a further embodiment of the reverse MRPOC spreading and PN masking unit 919 in which an MRPOC is applied only to the traffic channel and no complex spreading is performed for PN masking. FIG. 13 is another embodiment of the reverse MRPOC spreading and PN masking unit 919 in which odd-numbered and even-numbered bits are separated from the traffic channel, an MRPOC is applied to the odd-numbered and even-numbered bits, and no complex spreading is performed for PN masking. FIG. 14 is yet another embodiment of the reverse MRPOC spreading and PN masking unit 919 in which odd-numbered and even-numbered bits are separated from the traffic channel, an MRPOC is applied to the odd-numbered and even-numbered bits, and complex spreading is performed for PN masking.

Referring now to FIG. 10, a first spreader 1011 multiplies an input pilot/control channel signal by the MRPOC, Ci, and outputs a spread signal di. A second spreader 1013 multiplies an input traffic channel signal by an MRPOC, Cj, and outputs a spread signal dq. A repeater 1017 repeats the PN codes, PNi and PNq, received from the PN code generator 917 a predetermined number of times. A complex multiplier 1019 complex-multiplies the spread signals di and dq by the repeated PN codes, PNi and PNq, received from the repeater 1017 and generates PN-masked signals Xi and Xq. The complex multiplier 1019 operates according to equation (1) above for complex PN masking.

In FIG. 10, the MRPOCs, Ci and Cj are different, which implies that the respective subcodes of the MRPOCs, Ci and Cj, are different. In this reverse MRPOC spreading and PN masking unit 919, the pilot/control channel and the traffic channel can concurrently arrive at a base station, and thus mutual interference can be removed. However, the number of available MRPOCs is reduced by half.

Referring now to FIG. 11, a first spreader 1111 multiplies an input pilot/control channel signal by the MRPOC, Ci and outputs the spread signal di. A second spreader 1113 multiplies an input traffic channel signal by the MRPOC, Cj and outputs the spread signal dq. An adder 1115 adds the spread signal di received from the first spreader 1111 and the spread signal dq received from the second spreader 1113 to generate a signal di+dq. An adder 1117 adds the signals dq and di and generates a signal dq+di. A repeater 1121 repeats the PN codes, PNi and PNq received from the PN code generator 917 a predetermined number of times. A multiplier 1123 multiplies the spread signal di+dq received from the adder 1115 by the repeated PN code, PNi, received from the repeater 1121 and generates the PN-masked signal Xi. A multiplier 1125 multiplies the spread signal dq+di received from the adder 1117 by the repeated Pn code, PNq, received from the repeater 1121 and generates the PN-masked signal Xq.

In FIG. 11, the MRPOCs, Ci and Cj, are different. In this reverse MRPOC spreading and PN masking unit 919, the pilot/control channel and the traffic channel can concurrently arrive at a base station, and thus mutual interference can be removed. However, the number of available MRPOCs is reduced by half.

Referring now to FIG. 12, an MRPOC spreader 1211 multiplies an input traffic channel signal by the MRPOC, Ci, and generates a spread signal. A repeater 1215 repeats the PN codes, PNi and PNq, received from the PN code generator 917 a predetermined number of times. A multiplier 1217 multiplies an input pilot/control channel signal by a PN code, PNi', and a multiplier 1219 multiplies the input pilot/control channel signal by a PN code, PNq'. A multiplier 1221 multiplies the spread signal received from the MRPOC spreader 1211 by the repeated PN code, PNi received from the repeater 1215, and a multiplier 1223 multiplies the spread signal received from the MRPOC spreader 1211 by the repeated PN code, PNq, received from the repeater 1215. An adder 1225 adds the outputs of the multipliers 1217 and 1221 and generates the PN-masked signal Xi, and an adder 1227 adds the outputs of the multipliers 1219 and 1223 and generates the PN-masked signal Xq.

In FIG. 12, since an MRPOC is not applied to the pilot/control channel, there is no orthogonality between the pilot/control channel and the traffic channel. Thus, the channels are likely to suffer an interference as much as from the PN codes. In addition, the PN codes for spreading the pilot/traffic channel should be different from those for spreading the traffic channel, and users should be assigned different PN codes.

Referring now to FIG. 13, a serial-to-parallel converter 1315 separately outputs even-numbered and odd-numbered bits from an input traffic channel signal. A first spreader 1317 multiplies the even-numbered bits received from the serial-to-parallel converter 1315 by the MRPOC, Ci, and a second spreader 1319 multiplies the odd-numbered bits received from the serial-to-parallel converter 1315 by the MRPOC, Ci. A repeater 1323 repeats the PN codes, PNi and PNq, received from the PN code generator 917 a predetermined number of times. A multiplier 1311 multiplies an input pilot/control channel signal by the PN code, PNi', and a multiplier 1313 multiplies the input pilot/control channel signal by the PN code, PNq'. A multiplier 1325 multiplies the spread signal received from the first spreader 1317 by the PN code, PNi, received from the repeater 1323, and a multiplier 1327 multiplies the spread signal received from the second spreader 1319 by the PN code, PNq, received from the repeater 1323. An adder 1329 adds the outputs of the multipliers 1311 and 1325 and outputs the PN-masked signal Xi. An adder 1331 adds the outputs of the multipliers 1313 and 1327 and outputs the PN-masked signal Xq.

In FIG. 13, the traffic channel data is divided into two branches by the serial-to-parallel converter 1315 and an MRPOC having a length which is double the length of the original MRPOC is applied to each divided signal, in order to increase the number of available MRPOCs. The traffic channel data is separated into even-numbered data and odd-numbered data by the serial-to-parallel converter 1315. Since the data transmission rate of the data in each branch is a half of that at the serial-to-parallel converter 1315, the length of the MRPOC is doubled, thereby increasing the number of MRPOCs by a factor of two. Therefore, the number of the available MRPOCs is doubled as compared with the available MRPOCs for the embodiments of FIGS. 11 and 12. An identical MRPOC is applied to the even-numbered and odd-numbered data of the traffic channel. The respective spread signals becomes a real part and an imaginary part after PN masking, and are added to spread real and imaginary parts of the pilot/control channel, respectively.

Referring to FIG. 14, a serial-to-parallel converter 1415 separately outputs even-numbered and odd-numbered bits from an input traffic channel signal. A first spreader 1417 multiplies the even-numbered bits received from the serial-to-parallel converter 1415 by the MRPOC, Ci, and a second spreader 1419 multiplies the odd-numbered bits received from the serial-to-parallel converter 1415 by the MRPOC, Ci. A repeater 1423 repeats the PN codes, PNi and PNq received from the PN code generator 917 a predetermined number of times. A multiplier 1411 multiplies an input pilot/control channel signal by the PN code, PNi', and a multiplier 1413 multiplies the input pilot/control channel signal by the PN code, PNq'. A complex multiplier 1425 complex-multiplies (in accordance with equation (1) above) the spread signals di and dq received from the first and second spreaders 1417 and 1419 by the PN codes, PNi and PNq, received from the repeater 1423. An adder 1427 adds the output of the multiplier 1411 and the spread signal Xi' received from the complex multiplier 1425 and outputs the PN-masked signal Xi. An adder 1429 adds the output of the multiplier 1413 and the spread signal Xq' received from the complex multiplier 1425 and outputs the PN-masked signal Xq. The method of FIG. 14 is similar to that of FIG. 13 except that complex spreading is performed for PN masking of the traffic channel to make the signal strengths of the spread real and imaginary signals equal.

The various embodiments of the reverse MRPOC spreading and PN masking unit 919 shown in FIGS. 10 through 14 should be designed to be applicable to a cellular mobile communications system. Specifically, since base stations cannot be differentiated with a single MRPOC set, the number of MRPOC sets should be equal to that of base stations or a reuse factor. But, it is extremely difficult to generate so many sets of codes. Accordingly, a method for generating another MRPOC set with an MRPOC set can be employed. For this purpose, the PN masking is used.

When every base station uses a different PN code in the cellular mobile communications system, an MRPOC set can be commonly applied to base stations in such a way such that the base stations effectively use different MRPOCs. In this manner, the MRPOC sets mutually serve as PN codes and, thus, the intensity of an interference signal is proportional to the length of the PN codes. Yet, mutual orthogonality is maintained among elements of an MRPOC set. As a result, PN masking for differentiating MRPOC sets allows as many MRPOC sets to be generated as there are base stations. This concept will now be discussed in further detail.

Spectrum spreading and discrimination among users or channels are implemented using an orthogonal codes on a forward link in a CDMA mobile communications system of an IS-95 standard (or any other standard). Since all channels can be synchronized with a base station on a forward link, a transmission signal from the base station can be demodulated in a specific terminal without interference from a signal transmitted from the base station to a different terminal only if the transmission is conducted via a single path channel on the forward link. On the other hand, if signals are transmitted from the base station on multipath channels, an interference signal is generated from a signal from the base station to a different terminal.

Accordingly, the application of MRPOCs to the forward link contributes to reduction of an interference signal caused by multipath propagation, thereby dropping the operational signal strength point of the forward link. As a result, system capacity is increased. Consequently, the number of available MRPOCs should be increased. This can be achieved by the same method as discussed above for the reverse link. In particular, a serial-to-parallel converter is used to separately outputs odd-numbered data and even-numbered data of traffic channel data, each at half the data rate of the input traffic channel data. Each separated signal is spread twice so that the number of available MRPOCs is doubled and the MRPOC-induced system capacity increase can be realized.

According to the present invention as described above, the loss of orthogonality caused by a multipath propagation signal component in a spread spectrum method using a Walsh code is prevented by spreading a signal with an MRPOC in a transmitter of a mobile communications system.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for generating a pseudo-orthogonal code for orthogonally spreading channel data in a Code Division Multiple Access (CDMA) communications system, comprising the steps of:

selecting M orthogonal codes from N orthogonal codes; and sequentially interlacing the elements of said selected M orthogonal codes to generate a pseudo-orthogonal code, whereby said pseudo-orthogonal code is represented as a sequence of M×N elements.

2. The method of claim 1, wherein said interlacing step comprises the steps of:

arranging the selected orthogonal codes in a matrix of M rows by N columns; and sequentially outputting the elements of the orthogonal codes from the matrix by columns.

3. The method of claim 2, wherein said orthogonal codes are Walsh codes.

4. The method of claim 3, wherein said channel is a data traffic channel.

5. A method for generating a pseudo-orthogonal code for orthogonally spreading channel data in a Code Division Multiple Access (CDMA) communications system, comprising the steps of:

selecting first and second orthogonal codes each having a length of N elements; and sequentially interlacing elements of said first and second orthogonal codes to generate a pseudo-orthogonal code, whereby said pseudo-orthogonal code is represented by a sequence of 2N elements.

6. The method of claim 5, wherein said interlacing step includes the steps of:

arranging the selected orthogonal codes in a matrix of two rows by N columns; and sequentially outputting the elements of the orthogonal codes from the matrix by columns.

7. The method of claim 6, wherein said orthogonal codes are Walsh codes.

8. The method of claim 7, wherein said channel is a data traffic channel.

9. A device for orthogonally spreading channel data in a CDMA mobile communication system, comprising:

a demultiplexer for demultiplexing input channel data to M-branch parallel data;

M spreaders for spreading said demultiplexed M-branch parallel data with M different orthogonal codes respectively; and a multiplexer for sequentially interlacing the elements of said spread signal of M-branch data.

10. The device of claim 9, wherein said orthogonal codes are Walsh codes.

11. The device of claim 10, wherein said channel is a data traffic channel.

12. A device for orthogonally spreading channel data in a CDMA mobile communications system, comprising:

a demultiplexer for demultiplexing input channel data to two-branch parallel data;

two spreaders for spreading said demultiplexed two branch data in each of said branches with corresponding orthogonal codes respectively; and a multiplexer for sequentially interlacing the elements of said parallel spread signal.

13. The device of claim 12, wherein said orthogonal codes are Walsh codes.

14. The device of claim 13, wherein said channel is a data traffic channel.

15. A spread spectrum device using a pseudo-orthogonal code in a CDMA mobile communications system, comprising:

a pseudo-orthogonal code generator for generating a pseudo-orthogonal code being a combination of M different orthogonal codes each having a length of N elements;

a PN code generator for generating a PN code;

a pseudo-orthogonal code spreading and PN masking unit for spreading an input signal by the pseudo-orthogonal code, and PN masking the spread signal by the PN code; and an output unit for baseband-pass-filtering the output of the pseudo-orthogonal code spreading and PN masking unit and shifting the frequency of the filtered signal to an RF frequency.

16. The device of claim 15, wherein the pseudo-orthogonal code generator includes a table for storing M orthogonal codes, which are selected from N orthogonal codes, in the form of index pairs, and generates said pseudo-orthogonal code as a sequence of M×N elements by sequentially interlacing the elements of the M orthogonal codes in an index pair corresponding to an input code index.

17. The device of claim 16, wherein said pseudo-orthogonal codes generator generates said pseudo-orthogonal code as a sequence of M×N elements by arranging the selected orthogonal codes in a matrix of M rows by N columns, and sequentially outputting the elements of the orthogonal codes from the matrix by columns.

18. The device of claim 15, wherein the pseudo-orthogonal code spreading and PN masking unit comprises:
a pseudo-orthogonal code spreader for multiplying the input signal by the pseudo-orthogonal code;
a repeater for M times repeating the PN code received from the PN code generator; and
a PN spreader for multiplying the output of the pseudo-orthogonal code spreader by the repeated PN code received from the repeater.

19. A spread spectrum method using a pseudo-orthogonal code in a CDMA mobile communications system having a pseudo-orthogonal code generator for generating a pseudo-orthogonal code being a combination of M different orthogonal codes and a PN code generator for generating a PN code, comprising the steps of:
converting an input channel data bit stream;
dividing the converted signal to M branch signal sequences, multiplying each M branch signal sequence by the pseudo-orthogonal code, and multiplying the spread signal sequences by the PN codes, for PN masking; and
band-pass-filtering the PN-masked spread spectrum signals and shifting the frequency of the filtered signal to an RF frequency.

20. The method of claim 19, further comprising the step of generating a pseudo-orthogonal code as a sequence of M×N elements by sequentially interlacing the elements of M orthogonal codes, each having length of N elements.

21. The method of claim 20, wherein said interlacing step is performed by arranging the M orthogonal codes in a matrix of M rows by N columns, and sequentially outputting the elements of the orthogonal codes from the matrix by columns.

22. The method of claim 21, wherein said orthogonal codes are Walsh codes.

23. The method or claim 22, wherein the channel is a data traffic channel.

24. A spread spectrum signal generating device, comprising:
a serial-to-parallel converter for dividing data at a transmission rate of K into M parallel branch signal sequences each at a transmission rate of K/M;
a plurality of multipliers for multiplying M parallel branch signal sequences by M different orthogonal codes each having a length of N elements and generating M parallel branch spread signals in a matrix of $a_i W_{ij}$, $a_i$ being a divided signal sequence and $W_{ij}$ being an element of each orthogonal code;
a parallel-to-serial converter for converting the matrix $a_i W_{ij}$ to a serial spread signal of length M×N; and
a PN spreader for multiplying the serial spread signal by the PN code.

25. A spread spectrum signal generating device, comprising:
a serial-to-parallel converter for dividing data at a transmission rate of K into M parallel branch signal sequences each at a transmission rate of K/M;
a plurality of multipliers for multiplying the M parallel branch signal sequences by M different orthogonal codes each having a length of N and generating M parallel branch spread signals in a matrix of $a_i W_{ij}$, $a_i$ being a divided signal sequence and $W_{ij}$ being an element of each orthogonal code;
a parallel-to-serial converter for converting the matrix $a_i W_{ij}$ to a serial spread signal of length M×N; and
a complex multiplier for complex-multiplying the serial spread signal by the PN code.

26. A spread spectrum signal generating method, comprising the steps of:
dividing data at a transmission rate of K into M parallel branch signal sequences each at a transmission rate of K/M;
multiplying the M signal sequences by M different orthogonal codes each having a length of N and generating M parallel branch spread signals in a matrix of $a_i W_{ij}$, $a_i$ being a divided signal sequence and $W_{ij}$ being an element of each orthogonal code;
converting the matrix $a_i W_{ij}$ to a serial spread signal of length M×N; and
multiplying the serial spread signal by the PN code.

27. A spread spectrum signal generating method, comprising the steps of:
dividing data at a transmission rate of K into M parallel branch signal sequences each at a transmission rate of K/M;
multiplying the M signal sequences by M different orthogonal codes each having a length of N and generating M parallel branch spread signals in a matrix of $a_i W_{ij}$, $a_i$ being a divided signal sequence and $W_{ij}$ being an element of each orthogonal code;
converting the matrix $a_i W_{ij}$ to a serial spread signal of length M×N; and
complex-multiplying the serial spread signal by the PN code.

28. A spread spectrum signal generating device using a pseudo-orthogonal code in a CDMA mobile communications system, comprising;
a first signal converter for converting 0s and 1s of an input pilot/control channel data bit stream to +1s and −1s, respectively;
a second signal converter for converting 0s and 1s of an input traffic channel data bit stream to +1s and −1s, respectively;
a pseudo-orthogonal code generator for generating a pseudo-orthogonal code being a combination of M different Walsh codes;
a PN code generator for generating a real PN code and an imaginary PN code;
a pseudo-orthogonal code spreading and PN masking unit for dividing each of the signals received from the first and second converters to N signal sequences, multiplying each divided signal sequence by the pseudo-orthogonal code, generating M×N spread signal sequences, and multiplying the spread signal sequences by the PN codes, for PN masking; and
an output unit for baseband-pass-filtering the output of the pseudo-orthogonal code spreading and PN masking unit and shifting the frequency of the filtered signal to an RF frequency.

29. The device of claim 28, wherein the pseudo-orthogonal code spreading and PN masking unit comprises:
- a first pseudo-orthogonal code spreader for converting the first converted signal to M parallel signal sequences, multiplying each signal sequence by the pseudo-orthogonal code, generating M×N spread signal sequences, spreading the M signal sequences, and converting the M spread signal sequences to a serial sequence;
- a second pseudo-orthogonal code spreader for converting the second converted signal to M parallel signal sequences, multiplying each signal sequence by the pseudo-orthogonal code, generating M×N spread signal sequences, spreading the M signal sequences, and converting the M spread signal sequences to a serial sequence;
- a repeater for M times repeating the real PN code and the imaginary PN code received from the PN code generator; and
- a complex multiplier for complex-multiplying the outputs of the first and second pseudo-orthogonal code spreaders by the real PN code and the imaginary PN code received from the repeater, for PN masking.

30. The device of claim 28, wherein the pseudo-orthogonal code spreading and PN masking unit comprises:
- a first pseudo-orthogonal code spreader for converting the first converted signal to M parallel signal sequences, multiplying each signal sequence by the pseudo-orthogonal code, generating M×N spread signal sequences, spreading the M signal sequences, and converting the M spread signal sequences to a serial sequence;
- a second pseudo-orthogonal code spreader for converting the second converted signal to M parallel signal sequences, multiplying each signal sequence by the pseudo-orthogonal code, generating M×N spread signal sequences, spreading the M signal sequences, and converting the M spread signal sequences to a serial sequence;
- a first adder for adding the outputs of the first and second pseudo-orthogonal code spreaders;
- a second adder for adding the outputs of the second and first pseudo-orthogonal code spreaders;
- a repeater for M times repeating the real PN code and the imaginary PN code received from the PN code generator;
- a first multiplier for multiplying the output of the first pseudo-orthogonal code spreader by the real PN code received from the repeater, for PN masking; and
- a second multiplier for multiplying the output of the second pseudo-orthogonal code spreader by the imaginary PN code received from the repeater, for PN masking.

31. The device of claim 28, wherein the pseudo-orthogonal code spreading and PN masking unit comprises:
- a first multiplier for multiplying the first converted signal by a user real PN code;
- a second multiplier for multiplying the first converted signal by a user imaginary PN code;
- a serial-to-parallel converter for separating the second converted signal to an even-numbered bit signal and an odd-numbered bit signal;
- a first pseudo-orthogonal code spreader for converting the even-numbered bit signal to M parallel signal sequences, multiplying each signal sequence by the pseudo-orthogonal code, generating M×N spread signal sequences, spreading the M signal sequences, and converting the M spread signal sequences to a serial sequence;
- a second pseudo-orthogonal code spreader for converting the odd-numbered bit signal to M parallel signal sequences, multiplying each signal sequence by the pseudo-orthogonal code, generating M×N spread signal sequences, spreading the M signal sequences, and converting the M spread signal sequences to a serial sequence;
- a repeater for M times repeating the real PN code and the imaginary PN code received from the PN code generator;
- a third multiplier for multiplying the output of the first pseudo-orthogonal code spreader by the real PN code received from the repeater, for PN masking;
- a fourth multiplier for multiplying the output of the second pseudo-orthogonal code spreader by the imaginary PN code received from the repeater, for PN masking;
- a first adder for adding the outputs of the first and third multipliers, for PN masking; and
- a second adder for adding the outputs of the second and fourth multipliers, for PN masking.

32. The device of claim 28, wherein the pseudo-orthogonal code spreading and PN masking unit comprises:
- to a first multiplier for multiplying the first converted signal by a user real PN code;
- a second multiplier for multiplying the first converted signal by a user imaginary PN code;
- a serial-to-parallel converter for separating the second converted signal to an even-numbered bit signal and an odd-numbered bit signal;
- a first pseudo-orthogonal code spreader for converting the even-numbered bit signal to M parallel signal sequences, multiplying each signal sequence by the pseudo-orthogonal code, generating M×N spread signal sequences, spreading the M signal sequences, and converting the M spread signal sequences to a serial sequence;
- a second pseudo-orthogonal code spreader for converting the odd-numbered bit signal to M parallel signal sequences, multiplying each signal sequence by the pseudo-orthogonal code, generating M×N spread signal sequences, spreading the M signal sequences, and converting the M spread signal sequences to a serial sequence;
- a repeater for M times repeating the real PN code and the imaginary PN code received from the PN code generator;
- a complex multiplier for complex-multiplying the outputs of the first and second pseudo-orthogonal code spreaders by the real PN code and the imaginary PN code received from the repeater, for PN masking;
- a first adder for adding the output of the first multiplier by a first signal received from the complex multiplier, for PN masking; and
- a second adder for adding the output of the second multiplier and a second signal received from the complex multiplier, for PN masking.

33. A spread spectrum signal generating method using a pseudo-orthogonal code in a CDMA mobile communications system having a pseudo-orthogonal code generator for generating a pseudo-orthogonal code being a combination of M different Walsh codes and a PN code generator for generating a PN code being a real part and a PN code being an imaginary part, comprising the steps of:

generating a first converted signal by converting 0s and 1s of an input pilot/control channel data bit stream to +1s and −1s, respectively, and generating a second converted signal by converting 0s and 1s of an input traffic channel data bit stream to +1s and −1s, respectively;

dividing each of the first and second converted signals to M signal sequences, multiplying each divided signal sequence by the pseudo-orthogonal code, generating M×N spread signal sequences, and multiplying the spread signal sequences by the PN codes, for PN masking; and baseband-pass-filtering a PN-masked signal and shifting the frequency of the filtered signal to an RF frequency.

* * * * *